United States Patent

Dann

[15] 3,678,397

[45] July 18, 1972

[54] APPARATUS FOR CORRECTING PHASE SHIFTS IN ANGLE-MODULATED SIGNALS

[72] Inventor: Bert H. Dann, Mountain View, Calif.

[73] Assignee: Bell & Howell Company, Chicago, Ill.

[22] Filed: Oct. 31, 1969

[21] Appl. No.: 872,847

[52] U.S. Cl. ......................325/423, 178/5.4 CD, 178/5.4 R, 325/345, 325/421, 325/433, 325/435, 325/476, 329/154, 329/178, 331/18, 331/25

[51] Int. Cl. ..........................................................H04b 1/26

[58] Field of Search ...........178/5.4 CR, 5.4 R, 5.4 S, 6.6 TC; 325/45–49, 65, 344, 435, 472–474, 476, 416–423, 349, 433, 434, 329; 340/174.1 H; 179/100.2 MI, 100.2 S; 329/153, 154, 178; 331/1, 18, 25, 30, 34, 177

[56] References Cited

UNITED STATES PATENTS

| | | | |
|---|---|---|---|
| 3,277,390 | 10/1966 | McLin | 331/25 |
| 2,955,152 | 10/1960 | Keizer | 178/5.4 |
| 3,213,192 | 10/1965 | Jensen | 178/6.6 TC |
| 3,507,983 | 4/1970 | Leman | 178/5.4 CR |

*Primary Examiner*—Albert J. Mayer
*Attorney*—Luc P. Benoit

[57] ABSTRACT

Apparatus for providing an output signal having an angular position which follows in a fixed relationship the angular position of an angle modulated input signal in which a first phase shift is imposed on the input signal during a preliminary processing thereof, in which a second phase shift corresponding to the first phase shift is imposed on a feedback of said output signal, and in which said output signal is produced in response to a process including a heterodyning of said input signal having said first phase shift and said feedback having said second phase shift.

3 Claims, 2 Drawing Figures

PATENTED JUL 18 1972

3,678,397

INVENTOR.
BERT H. DANN
BY
[signature]
ATTORNEY

APPARATUS FOR CORRECTING PHASE SHIFTS IN ANGLE-MODULATED SIGNALS

BACKGROUND OF THE INVENTION

1. Field of the Invention

The subject invention relates to signal processing systems and, more particularly, to apparatus for correcting angle-modulated signals.

2. Description of the Prior Art

Angle-modulated signals are of widespread use in the electrical and electronic arts. A particularly striking example is found in the important field concerned with the recording and playback color video signals. Accordingly, the prior art and the subject invention will be described in terms of problems occurring in the latter field, although the application of the invention is not limited thereto, as those skilled in the art will recognize.

This requires a brief consideration of relevant problems arising in the recording and playback of color video signals.

By way of summary, a composite color video signal comprises a luminance component and a chrominance component. The latter includes phase and amplitude modulated components disposed about a suppressed subcarrier which, in the NTSC system, nominally oscillates at 455 times half-line frequency or at approximately 3.58 MHz. In certain low-cost industrial systems, the latter half-line frequency factor is not necessarily observed, although the nominal line-scan and color subcarrier frequencies correspond very closely to those of the NTSC system.

If a composite color video signal is recorded on and reproduced from magnetic tape, to name an example, factors such as flutter and wow in the recording and playback processes, tape shrinking and elongation, and head-to-tape spacing irregularities produce angular variations in the reproduced video signal.

Such angular errors in the luminance component are generally tolerated by the eye, particularly if they are kept within sensible limits by the use of adequate recording and playback machines. By contrast, the above mentioned nature of the chrominance component makes this component particularly vulnerable to angular errors, as is easily seen from the fact that the phase-modulated component in the chrominance signal contains color hue information and that the eye is particularly sensitive to hue aberrations. Moreover, a shift in average frequency in the color reference carrier rate of the played-back video signal of typically more than about ± 100 to 200Hz exceeds the pull-in range of the color reference synchronization circuits of typical color monitors or color television receivers employed for viewing the played-back signal. This at least results in a complete random display of colors. In the vast majority of color television receiving sets, no color at all will, however, be displayed since the lack of color reference synchronization prevents the conventionally employed chroma gating or "color killer" circuits from enabling the color circuits of the set.

In an effort to counter these detrimental effects, a system has been proposed in which the degraded chrominance portion of the played-back video signal is decoded into separate color components by means of a reference signal which reflects angular errors in the video signal and which is either derived from one or more pilot signals recorded and reproduced with the video signal or from the color synchronizing signal or "color bursts" contained in the played-back chroma signal.

Effects of angular errors may be corrected in the decoded color components since the decoding reference signal is affected with practically the same angular errors as the played-back chrominance signal.

A different approach is apparent from another proposal according to which the played-back color signal is subjected to heterodyning operations which involve the use of a locally produced stable reference signal and of a variable reference signal which reflects angular errors in the played-back color signal.

All of these proposals presuppose the availability of a reference signal being substantially free of noise and having an angular position which follows in a fixed relationship the angular position of the angle-modulated, error-indicative signal derived from the played-back signal.

The elimination of noise from the latter signal calls for the use of a high-grade filtering means. Unfortunately, such means generally have a given phase-versus-frequency characteristic which introduces angular errors which indirectly impair the quality of the color signals produced by the above mentioned decoding or heterodyning operations.

SUMMARY OF THE INVENTION

The subject invention overcomes the above mentioned disadvantage and from one aspect provides apparatus for providing from an angle-modulated first reference signal affected by noise a second reference signal having an angular position which follows in a fixed relationship the angular position of said angle-modulated first reference signal.

According to the subject invention, this apparatus comprises in combination:

a. first means for providing said first reference signal affected by noise;
b. second means connected to said first means for filtering said first reference signal from said noise, said second means including first filter means imposing a first phase shift on said first reference signal;
c. third means including buffer means for deriving a feedback signal from said second reference signal
d. second filter means connected to the third means for imposing on said feedback signal a second phase shift corresponding to said first phase shift;
e. fourth means connected to said first and second filter means for heterodyning said first reference having said first phase shift and said feedback signal having said second phase shift to produce a heterodyned signal;
f. fifth means connected to said fourth means for extracting from said heterodyned signal a difference signal corresponding to the frequency difference between said first reference signal having said first phase shift and said feedback signal having said second phase shift;
g. sixth means for providing a stable third reference signal;
h. seventh means connected to said fifth and sixth means for deriving a phase-error signal varying in accordance with phase discrepancies between said stable third reference signal and said difference signal;
i. oscillator means connected to said seventh means for providing in response to said phase-error signal said second reference signal having said angular position, with said third means being connected to said oscillator means;

From a further aspect thereof, the invention provides apparatus for correcting effects of angular errors in color video signal accompanied by a first reference signal angle-modulated in accordance with said angular errors and affected by noise.

In accordance with this further aspect of the subject invention, the latter apparatus comprises in combination:

a. first means for providing said color video signal with said angular errors and said angle-modulated first reference signal;
b. second means connected to said first means for separating said angle-modulated first reference signal from said color video signal;
c. third means connected to said second means for filtering said angle-modulated first reference signal from said noise, said third means including first filter means imposing a first phase shift on said angle-modulated first reference signal;
d. fourth means connected to said third means for receiving said phase-shifted angle-modulated and filtered first reference signal and for correcting said first phase shift to produce a second reference signal having an angular position which follows in a fixed relationship the angular position of said angle-modulated first reference signal prior to imposition of said first phase shift, said fourth means including buffer means for deriving a feedback signal from said second reference signal, second filter means connected to said buffer means for imposing on said feedback signal a second phase shift corresponding to said first phase shift, means connected to said first and second filter means for heterodyning said first reference signal having said first phase shift and said feedback signal having said second phase shift to produce a heterodyned signal, means connected to said heterodyning means for extracting from said heterodyned signal a difference signal corresponding to the frequency difference between said first reference signal having said first phase shift and said feedback signal having said second phase shift, means for providing a stable reference signal, means connected to said difference signal extracting means and said stable third reference signal providing means for deriving a phase-error signal varying in accordance with phase discrepancies between said stable third reference signal and said difference signal, and oscillator means connected to said phase-error deriving means for providing in response to said phase-error signal said second reference signal having said angular position, with said buffer means being connected to said oscillator means e. fifth means connected to said first and fourth means for processing said color video signal with the aid of said second reference signal to dispose modulation components of said color video signal about a substantially stable carrier while substantially retaining phase and amplitude interrelationships of said modulation component.

Further aspects of the subject invention will be described as this disclosure proceeds.

BRIEF DESCRIPTION OF DRAWINGS

The invention will become more readily apparent from the following detailed description of preferred embodiments thereof, illustrated by way of example in the accompanying drawings, in which.

DESCRIPTION OF THE PREFERRED EMBODIMENTS

Figures 1, 2:
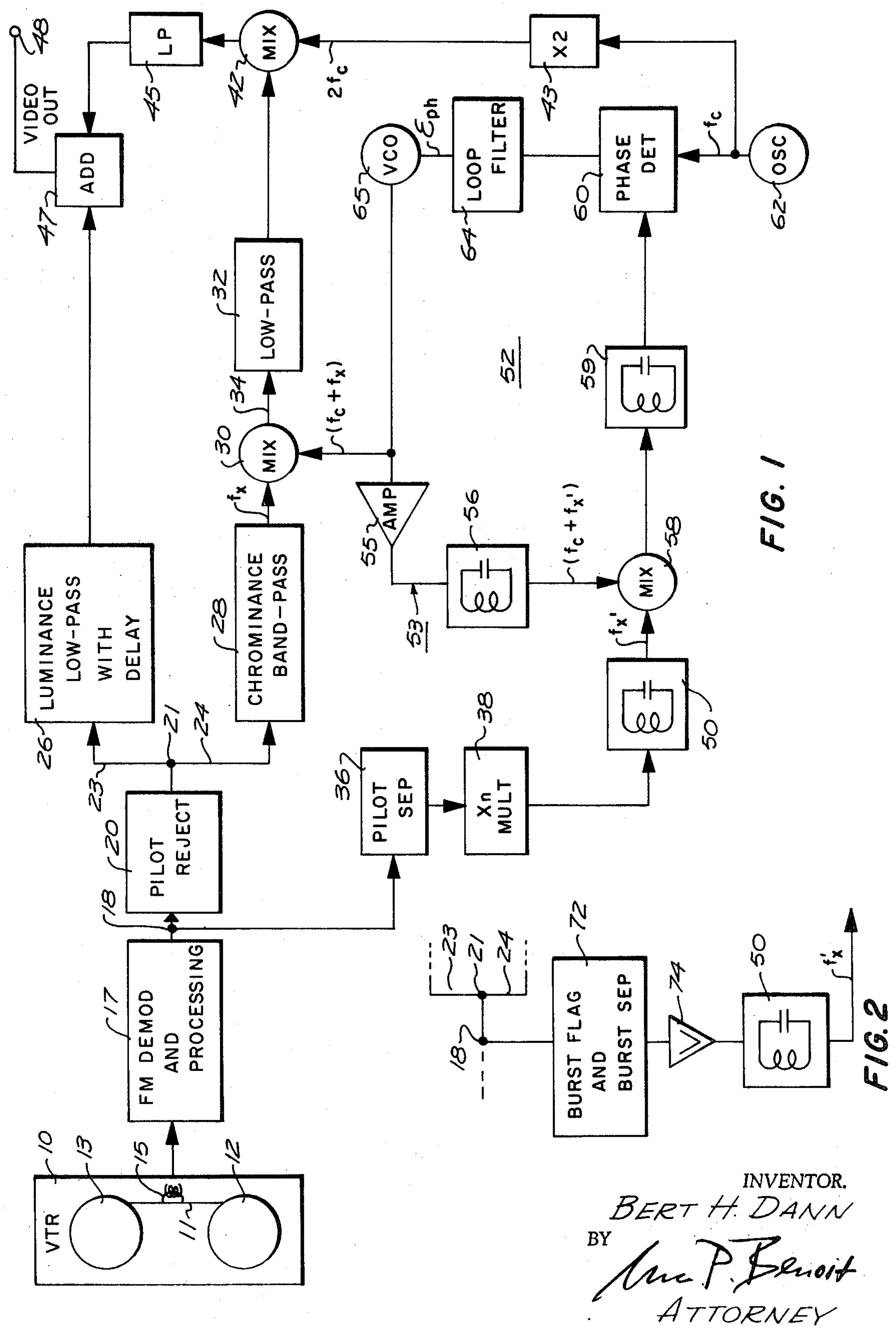
FIG. 1 is a block diagram of a signal correcting apparatus in accordance with a first preferred embodiment of the invention.
FIG. 2 is a block diagram of a modification of the apparatus illustrated in FIG. 1.

FIG. 1 symbolically shows a video tape recording apparatus 10 on which a magnetic recording tape 11 is wound from a reel 12 onto a reel 13 by means of conventional machinery (not shown). A color video signal recorded on the tape 11 is reproduced by means of playback head 15.

In practice, it is customary to keep the required velocity of the tape 11 within feasible limits by having the playback head 15, or a plurality of playback heads, execute a transverse or slant-track scan relative to the tape 11. Means for accomplishing these and other advantageous scanning patterns are well known in the art and are thus not illustrated herein.

It is also generally known to be advantageous to subject composite video signals to a selected modulation, prior to the recording thereof so as to improve the quality of the reproduced video signal. So far, frequency modulation has been most widely used for this purpose, but nothing mentioned or indicated herein is intended to preclude the use of any other suitable kind of modulation, or unmodulated or direct recording.

The signal played back by means of the head 15 is applied to a processing stage 17 which includes amplifier, demodulator and related means of the type customarily employed to render a reproduced composite video signal suitable for further processing.

It should be understood in this connection that the demodulator in block 17 does not resolve the composite video signal into its components, but rather demodulates such signal from the FM carrier or other modulation used for recording purposes as mentioned above.

In connection with the system illustrated on FIG. 1, it is assumed that a pilot signal has been recorded and is being played back along with a composite video signals. The utilization and processing of such pilot signals, which are affected by the same angular errors as the composite video signal and which comprise one pilot tone or are composed of several pilot tones, is known in the art. In a sense, the angle-modulated pilot signal may be considered as included in the video signal which is applied by the stage 17 to a point 18.

In the embodiment illustrated in FIG. 1, a pilot rejection circuit 20 is connected between the point 18 and a point 21 to reject the pilot signal from the played-back composite color video signal. In many instances it will be found that spurious components are generated by the pilot signal in the limiter which is conventionally provided after the demodulator and which in FIG. 1 is considered included with such demodulator in the block 17. In such cases the limiter may be connected between the pilot rejection circuit 20 and the point 21 so that the pilot signal is removed from the video signal that is applied to the limiter.

In accordance with prior art practice, the pilot rejection circuit 20 may include frequency-selective means which preclude the passage of signals in the pilot frequency range to the point 21.

The video signal applied at point 21 is applied to branches 23 and 24. The branch 23 may be termed the "luminance branch" while the branch 24 may be called "chrominance branch." As suggested by this terminology, the branch 23 includes low-pass filter means 26 which extract the luminance component from the composite video signal, or at least a major portion of such luminance component. By way of example, the low-pass filter means included in block 26 may have a cutoff frequency of about 3MHz. The block 26 may also include time delay means which compensate in a conventional manner for delays occurring in the chrominance branch 24.

The chrominance branch 24 includes filter means 28 which extract the chrominance component, or at least a major portion of such component, from the composite video signal occurring at point 21. By way of example, the filtering means 28 may include a bandpass filter having a range of about 1MHz between about 3MHz and 4MHz. If desired, the filter means 28 may alternatively include high-pass filter means having a lower cutoff frequency of about 3MHz. In practice, the choice of a high-pass filter in lieu of bandpass filter means may be more advantageous, since relative phase-versus-frequency shifts in the two branches 23 and 24 are reduced if the filter means 26 and 28 are of a complementary type. The fact that a high-pass filter generally does not cut off frequencies above the band here of interest is not generally detrimental, as long as the recorder 10 displays itself a limited bandwidth.

The extracted color signal is applied to a mixer 30. It will be realized in this connection that factors such as flutter and wow in the recording and playback processes, shrinking and elongations of the tape 11, and spacing irregularities between the recording head and the tape or the playback head 15 and the tape 11, reflect themselves in the form of angular degradations in the chrominance signal applied to the mixer 30. These degradations, to the extent they are of relevance to the subject discussion, are herein broadly referred to as angular errors.

As mentioned initially, angular errors are particularly objectionable in color video signals, since they lead to easily noticeable hue aberrations.

For present purposes, the frequency or phase of the degraded color signal is designated as $f_x$ which may be defined as:

$$f_x = f_r\,(2+\Delta)$$

wherein $f_r$ is the standard color subcarrier frequency (approximately 3.58 MHz in the NTSC system) which was present in the signal at the time of recording, while Δ designates an angular error (typically time varying) in the played-back signal. A new color subcarrier frequency, designated $f_c$, is generated by a stable oscillator 62. Although not necessarily precisely equal to the frequency $f_r$ described above, the frequency of $f_c$ is sufficiently close to the standard NTSC color subcarrier frequency to achieve proper operation of the color-synchronization circuits of standard NTSC color monitors and receivers. It is the subcarrier frequency about which the chrominance modulation components will be disposed after processing and, being locally generated by stable oscillator 62, is quite stable in the sense of not being affected with Δ errors.

In addition to the signal designated by $f_x$, a reference signal composed of $(f_c+f_x)$ is applied to a second input of the mixer 30. This mixer heterodynes the signal $(f_c+f_x)$ with the signal $f_x$. Among the products of such heterodyning step, there is a component which represents the frequency difference between the latter two signals. A low-pass filter 32 extracts such frequency-difference component from the output of the mixer 30. If the $f_x$ term in the $(f_c+f_x)$ reference signal corresponds in frequency exactly to $f_r(1+\Delta)$, then the frequency-difference component just mentioned will be at the frequency $f_c$. Fixed or slowly varying phase discrepancies between the $f_x$ term in the $(f_c+f_x)$ reference signal and the $f_x$ input of the mixer will generally not result in improper system operation, since the modulated chrominance information will be preserved.

It is understood that the stable carrier $f_c$ itself is suppressed in accordance with standard practice. In the instant apparatus, this carrier suppression is effected in the mixer 30. This mixer preferably is of a doubly balanced type to assume adequate suppressions of components disposed about $f_x$. The nature, construction and operation of doubly-balanced mixers are well known in the electronics art.

A mixer 42 is connected to the output of the filter 32 and serves to re-establish the correct angular relationship between the color burst and other chrominance vectors which was reversed by the heterodyning process in mixer 30. The mixer 42 is driven by a reference signal of $2f_c$ which is provided by a factor-of-two multiplier 43 connected to the stable oscillator 62. A low-pass filter 45 is connected to the output of the mixer 42 to extract the lower frequency component from the hederodyning product. The component extracted by the filter 45 may be viewed as a chrominance signal the modulation components of which are disposed about a substantially stable carrier, while phase and amplitude interrelationships of such modulation components are retained.

An adding network or amplifier 47 recombines the luminance component derived from the filter 26 and the processed chrominance component derived from the filter 45 into a composite video signal which is applied to the system output 48. The composite video signal at the output 48 may thereupon be utilized in a conventional manner such as by application to suitable color television receiver circuits. If desired, the composite video signal at the output 48 may be modulated on a carrier for the application thereof to antenna terminals or another easily accessible part of a television receiving set.

Returning to point 18, it will be noted that a pilot separating circuit 36 is connected to such point. This pilot separating circuit may be of a conventional design and may include bandpass filter means for extracting the pilot signal from the composite video signal processed by the stage 17. From a circuit point of view, it would be best if the pilot signal oscillated about a frequency which corresponds to the nominal frequency of the chrominance subcarrier. However, the presence of such a pilot in the composite video signal would lead to interference with the chrominance modulation components. Accordingly, present practice prefers pilots which have a frequency that corresponds to a submultiple of the nominal carrier frequency and which does not otherwise lead to objectionable interference with video signal components.

According to one prior art proposal, the pilot frequency is made to be one-seventh of the nominal chrominance subcarrier frequency. In this case, the played-back pilot signal has to be multiplied in frequency by a factor of seven to obtain a workable angle-modulated reference signal.

Other prior art proposals contemplate the use of a pilot which has a frequency that is a sub-multiple of the nominal chrominance carrier frequency and that requires both frequency multipliers and frequency dividers for restoring the frequency of the played-back pilot signal to the desired range occupied by the chrominance subcarrier frequency.

Accordingly, the embodiment of FIG. 1 employs a frequency restoring stage 38 which is connected to the pilot separator 36 and which restores the frequency of the played-back pilot signal. In the illustrated embodiment, the frequency restoring stage 38 restores the frequency of the played-back pilot signal to the $f_x$ range. In practice the played-back pilot signal is affected by noise, and a tuned bandpass filter 50 is therefore connected to the stage 38 for filtering the output signal of the stage 38 from its attendant noise.

The phase $\theta_x'$ of the filtered signal $f_x'$ provided at the output of the bandpass filter 50 may be expressed as:

$$\theta_x' = t\omega_x + \phi_T(t)$$

Wherein t designates time, $\omega_x$ is the angular frequency of $f_x$ and $\phi_T$ represents the $d\phi/df$ or frequency derivative of the phase shift reproduced by the bandpass filter 50 and any other filter or component in the pilot extraction or frequency restoration circuit (e.g., a bandpass in the pilot separator 36). The bandpass filter 50 may be of a conventional design including several cascaded double or triple-tuned circuits for the achievement of a relatively high circuit quality or Q factor.

A phase-locked loop 52 is connected to the filter 50 to provide the above mentioned modulator reference signal $(f_c=f_x)$ from the output signal of the filter 50 so that the angular position of such reference signal follows in a fixed relationship the angular position of the played-back pilot signal. Expressed in other words, the phase-lock loop 52 provides an output signal $(f_c+f_x)$ which includes a replica of angle positions of the angle-modulated played-back pilot signal.

To this end, the loop 52 includes a feedback branch 53 which is composed of a buffer amplifier 55 and filter means 56. The buffer amplifier 55 amplifies and feeds the loop output signal $(f_c+f_x)$ to the filter means 56. The filter means 56 are tuned to a frequency range of $(f_c+f_x)$ and may be composed of cascaded double or triple-tuned circuits to provide a relatively high circuit quality or Q factor in favor of an adequate bandpass filtering action. The bandpass filter 56 is designed to impose on the $(f_c+f_x)$ signal applied to it the same phase shift $\phi_T(t)$ as that imposed by the filter 50, and components 36 and 38 so that the filter 56 supplies a signal $(f_c+f_x')$ wherein the $f_x'$ component in that signal corresponds to the $f_x'$ signal provided by the filter 50.

The feedback signal thus derived from the $(f_c+f_x)$ output signal is applied to a first input of a mixer 58. The $f_x'$ signal filtered by the stage 50 is applied to a second input of the mixer 58 to be heterodyned therein with the latter feedback signal.

A further bandpass filter 59 extracts the difference-frequency component of the heterodyned signals from the output product of the mixer 58. The filter 59 may be composed of several tuned stages and is tuned to a frequency of $f_c$ which corresponds to the standard chrominance subcarrier frequency. The filter 59 has a sufficient bandwidth to accommodate the angular error variations occurring in the pilot signal. The signal extracted by the filter 59 is the difference between $(f_c+f_x')$ and $f_x'$. This difference is $f_c$ if $f_x'$ has the same phase in both of these signals.

A phase detector 60 compares the phase of the difference signal to the phase of a stable reference signal produced by a local oscillator 62 and having a frequency of $f_c$ as defined above. The result of such comparison is a phase-error signal $E_{ph}$ which varies in accordance with phase discrepancies between the two input signals applied to the phase detector 60. A loop filter 64 is inserted in the loop 52 to stabilize the operation of this phase-locked loop in a conventional manner.

The phase-error signal $\epsilon_{ph}$ is applied to a voltage-controlled oscillator 65 which, in a manner generally known per se, provides an output signal that is controlled in phase by the input error signal $\epsilon_{ph}$. In the instant case, the voltage-controlled oscillator provides a signal of $(f_c + f_x)$ wherein the $f_x$ component is phase-modulated in accordance with variations of the error signal $\epsilon_{ph}$.

As mentioned above, this $(f_c + f_x)$ signal is applied to the mixer 30 of the signal processing means 34 for disposing modulation components of the chrominance signal applied to the modulator 30 about a substantially stable carrier. As also mentioned above, the low-pass filter 32 extracts from the output of the modulator 30 a component which represents the frequency difference between the $(f_c + f_x)$ reference signal and the $f_x$ chrominance signal. If the angular error in the $f_x$ component of such reference signal corresponds exactly to the angular error in the chrominance signal applied to the mixer 30, effects of such angular error are no longer present in the output of the low-pass filter 32. However, if angular errors imposed in the above mentioned manner by the bandpass filter 50 and other filters in the pilot extraction circuit were permitted to occur in the $(f_c + f_x)$ reference signal, such errors would of course be reflected in the output signal of the low-pass filter 32.

In the illustrated embodiment such undesirable effects are curbed by providing in the feedback path 53 of the phase-locked loop 52 a phase shift (filter 56) which corresponds to the phase shift introduced into the played-back pilot signal by the filter 50 and other components in the pilot extraction circuit. Once the loop 52 is locked, phase shifts imposed by loop components other than the filter 56 assume generally negligible values.

For a further understanding of the operation of the phase-locked loop 52, it is assumed that the phase error in the played-back pilot signal varies from a first value to a second value. This, of course, means that the error element in the $f_x'$ signal differs from the phase error element in the $(f_c + f_x)$ output signal of the loop 52. This discrepancy leads to a variation in the input signal supplied through the filter 59 to the phase detector 60.

The phase detector input signal variation just mentioned is reflected in a corresponding variation of the phase-error signal $\epsilon_{ph}$. Since the phase of the $(f_c + f_x)$ loop output signal is controlled by the voltage controlled oscillator 65 in response to the error signal $\epsilon_{ph}$, the phase of such $(f_c + f_x)$ signal is adjusted by action of the loop 52 until the angular error in the $(f_c + f_x)$ signal corresponds correctly to the angular error in the played-back pilot signal.

In consequence, the signal processing means 34, which include the mixer 30 to which the loop output signal $(f_c + f_x)$ is applied as a reference signal, are enabled to correct effects of angular errors in the played-back chrominance signal.

A modification of the system shown in FIG. 1 is illustrated in FIG. 2. This modification proceeds on the assumption that angular error information is not derived from a recorded pilot signal, but rather from the color synchronization signal or "-color bursts" contained in the chrominance signal in accordance with standard practice.

The idea to use color burst signals for the purpose of providing a reference signal which reflects angular errors of a played-back chrominance signal is old as such, and presents a workable solution because of the fact that factors which induce angular errors in the video portion of a chrominance signal tend to introduce like angular errors into the color burst oscillations.

In the modification illustrated in FIG. 2, a block 72 connected to the above mentioned point 18 is representative of means for deriving color burst signals from the composite color video signal appearing at such latter point. In accordance with known practice, the block 72 may include a conventional burst separator stage as well as a burst flag generator which gates the separator in response to horizontal sync pulses derived from the composite video signal.

The bursts derived by the block 72 are applied to an amplifier 74 and the amplified bursts are applied to a bandpass filter 50 of the above mentioned type to remove noise therefrom.

The resulting error signal $f_x'$ is applied to the mixer 58 of the phase-locked loop 52 which thereupon operates in the above mentioned manner to provide the $(f_c + f_x)$ reference signal for the mixer 30.

If the modification shown in FIG. 2 is employed, the pilot rejection circuit 20, the pilot separator 36, and the restoration stage 38 in FIG. 1 should be deleted. The operation of the modified system is in other respects the same as the one described above in connection with the unmodified system illustrated in FIG. 1.

Other modifications within the spirit and scope of the subject invention will be apparent or suggest themselves to those skilled in the art.

I claim:

1. Apparatus for providing from an angle-modulated first reference signal affected by noise a second reference signal having an angular position which follows in a fixed relationship the angular position or said angle-modulated first reference signal, comprising in combination:

a. first means for providing said first reference signal affected by noise;
b. second means connected to said first means for filtering said first reference signal from said noise, said second means including first filter means imposing a first phase shift on said first reference signal;
c. third means including buffer means for deriving a feedback signal from said second reference signal;
d. second filter means connected to said third means for imposing on said feedback signal a second phase shift corresponding to said first phase shift;
e. fourth means connected to said first and second filter means for heterodyning said first reference signal having said first phase shift and said feedback signal having said second phase shift to produce a heterodyned signal;
f. fifth means connected to said fourth means for extracting from said heterodyned signal a difference signal corresponding to the frequency difference between said first reference signal having said first phase shift and said feedback signal having said second phase shift;
g. sixth means for providing a stable third reference signal;
h. seventh means connected to said fifth and sixth means for deriving a phase-error signal varying in accordance with phase discrepancies between said stable third reference signal and said difference signal; and
i. oscillator means connected to said seventh means for providing in response to said phase-error signal said second reference signal having said angular position, with said third means being connected to said oscillator means.

2. Apparatus as claimed in claim 1, wherein said third, fourth, fifth and seventh means, said second filter means, and said oscillator means are connected in a phase-locked circuit.

3. Apparatus for correcting effects of angular errors in a color video signal accompanied by a first reference signal angle-modulated in accordance with said angular errors and affected by noise, comprising in combination:

a. first means for providing said color video signal with said angular errors and said angle-modulated first reference signal;
b. second means connected to said first means for separating said angle-modulated first reference signal from said color video signal;
c. third means connected to said second means for filtering said angle-modulated first reference signal from said noise, said third means including first filter means imposing a first phase shift on said angle-modulated first reference signal;
d. fourth means connected to said third means for receiving said phase-shifted angle-modulated and filtered first reference signal and for correcting said first phase shift to produce a second reference signal having an angular position which follows in a fixed relationship the angular position of said angle-modulated first reference signal prior to imposition of said first phase shift, said fourth means including buffer means for deriving a feedback signal from said second reference signal, second filter means connected to said buffer means for imposing on said feedback signal a second phase shift corresponding to said first phase shift, means connected to said first and second filter means for heterodyning said first reference signal having said first phase shift and said feedback signal having said second phase shift to produce a heterodyned signal, means connected to said heterodyning means for extracting from said heterodyned signal a difference signal corresponding to the frequency difference between said first reference signal having said first phase shift and said feedback signal having said second phase shift, means for providing a stable reference signal, means connected to said difference signal extracting means and said stable third reference signal providing means for deriving a phase-error signal varying in accordance with phase discrepancies between said stable third reference signal and said difference signal, and oscillator means connected to said phase-error deriving means for providing in response to said phase-error signal said second reference signal having said angular position, with said buffer means being connected to said oscillator means;

e. fifth means connected to said first and fourth means for processing said color video signal with the aid of said second reference signal to dispose modulation components of said color video signal about a substantially stable carrier while substantially retaining phase and amplitude interrelationships of said modulation components.

* * * * *

PO-1050
(5/69)

UNITED STATES PATENT OFFICE
CERTIFICATE OF CORRECTION

Patent No. 3,678,397 Dated July 18, 1972

Inventor(s) Bert H. Dann

It is certified that error appears in the above-identified patent and that said Letters Patent are hereby corrected as shown below:

Column 4, line 8, "signals" should be -- signal --

Column 4, line 73, "$f_x = f_r(2 + \Delta)$" should be -- $f_x = f_r(1 + \Delta)$ --

Column 6, line 72, "$E_{ph}$" should be -- $\epsilon_{ph}$ --.

Signed and sealed this 20th day of November 1973.

(SEAL)
Attest:

EDWARD M. FLETCHER, JR.
Attesting Officer

RENE D. TEGTMEYER
Acting Commissioner of Patents